3,296,683
TOOL HOLDER FOR BITS AND THE LIKE
William Henry Kaiser, 2915 Weisser Park Ave.,
Fort Wayne, Ind. 46806
Filed May 7, 1965, Ser. No. 454,072
15 Claims. (Cl. 29—96)

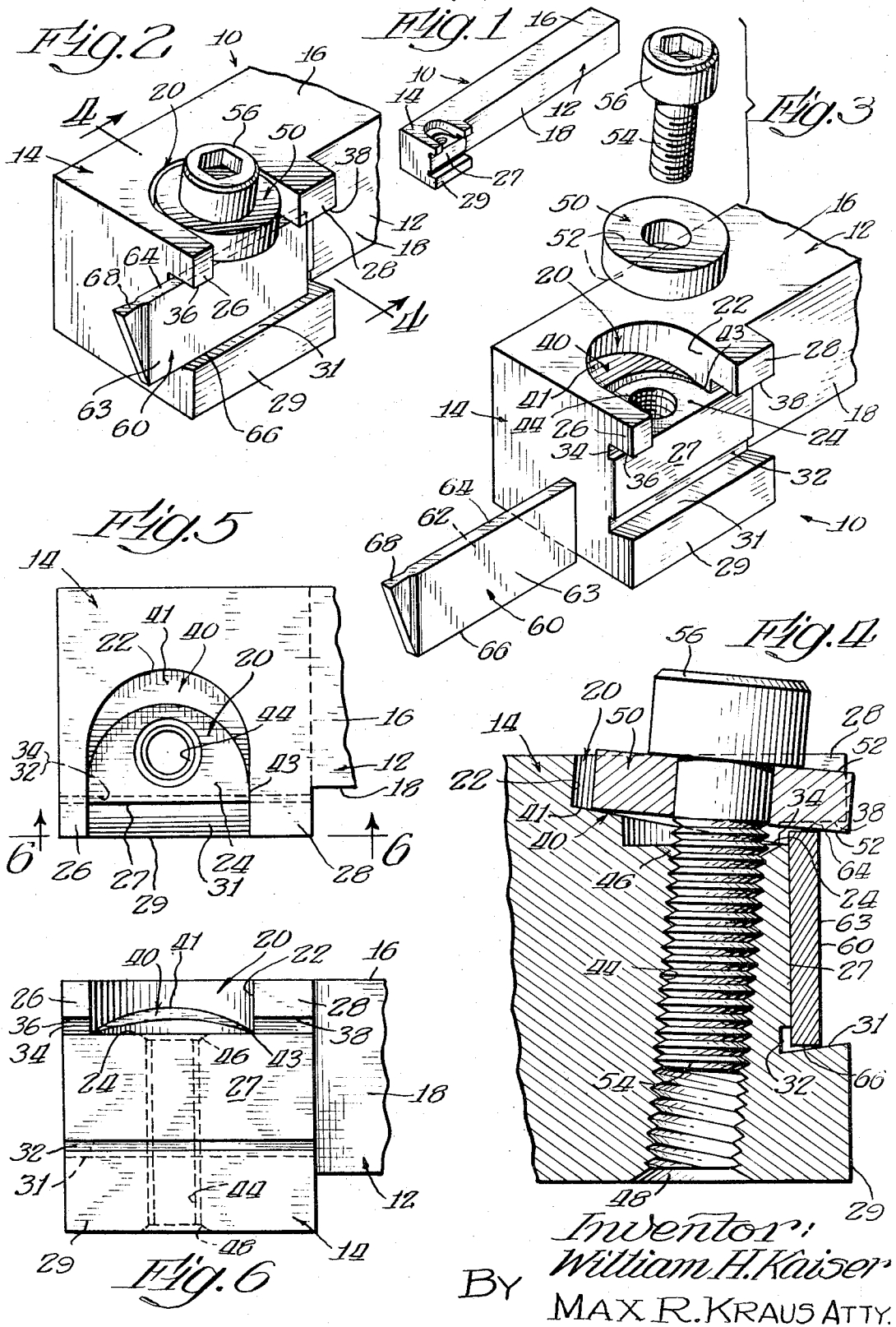

This invention relates to improvements in a tool holder for bits and the like.

One of the objects of this invention is to provide a holder which will effectively support a cutting tool or bit while same is being operated.

Another object of this invention is to provide a tool for holding bits, particularly small bits that are used for grooving and the like.

Another object of this invention is to provide a tool holder for holding miniature cutters or bits in a tight fit relationship so that same are maintained in their locked position while the cutter or bit is being used.

Holders for small bits, grooving tools or miniature cutters have proved inefficient in that due to the small size and dimensions the bit or cutter could not be held in a firm positive position to resist all the forces that are imposed, such as the forces of pressure and vibration. As a result the bit or tool would loosen in the holder or would very easily become misalined. These disadvantages have been overcome with the present invention in which the cutter or bit is locked in its set position and is maintained in its position during operation of the cutter or bit.

This invention has particular application in holding bits or grooving tools of miniature sizes which are incapable of being positively held in other types of holders. For example, this tool holder can hold any size bit from .010 to .050. This permits grooving within .0002 of bit size and grooves may be cut as small as .010 wide to as large as .050 wide. Obviously, the same invention may be applied for holding bits of larger sizes by varying the dimensions and size of the holder and parts.

Another object of this invention is to provide an inexpensive tool holder which is highly efficient.

Other objects will become apparent as this description progresses.

In the drawings:

FIG. 1 is a perspective view of the tool holder drawn to scale.

FIG. 2 is an enlarged perspective view of the head of the holder with a bit or cutting tool supported therein.

FIG. 3 is an enlarged exploded view of the parts shown in FIG. 2.

FIG. 4 is an enlarged sectional view taken on line 4—4 of FIG. 2.

FIG. 5 is a top plan view showing the head of the holder, and

FIG. 6 is a view taken on line 6—6 of FIG. 5.

The tool holder is generally indicated by the numeral 10 and comprises a shank 12 of generally rectangular shape which has a head generally indicated at 14, all integrally formed of steel or the like which is hardened. The shank has a top 16 and a front vertical side wall 18. The head 14 is at the forward end of the shank and includes a generally U-shaped recess 20 having a vertical wall 22 and a bottom wall 24.

Extending forwardly or outwardly at the head are spaced overhanging members 26 and 28. The head has a front vertically extending side wall 27 which is positioned forwardly of the plane of the front side wall 18 of the shank but is parallel thereto. The overhanging members 26 and 28 extend outwardly or forwardly of the front vertical wall 27.

Extending forwardly or outwardly of the front side wall 27 is a lip or ledge generally indicated at 29, the front of which is on the same vertical plane as the front of the overhanging members 26 and 28. The ledge 29 has an inclined top surface or wall 31 which has an inclination or slope of approximately 4°. Said top wall extends inwardly into a recess 32 formed below the front side wall 27. A recess 34 is formed in the front wall 27 below the overhanging members 26 and 28. The undersurfaces 36 and 38 of the overhanging members 26 and 28 extend in a straight horizontal plane.

The bottom wall 24 of the U-shaped recess 20 is on a flat horizontal plane. Extending above the surface 24 is a crescent shaped member 40 in which the central portion 41 of the crescent forms the highest point of said crescent, with the opposite sides 42 of the crescent sloping downwardly toward the bottom surface 24 to a reduced lower plane. The central portion 41 of the crescent from adjacent the vertical wall 22 slopes downwardly toward the bottom wall 24 of the recess. The angle of slope is approximately 8°, declining toward the tool bit. The crescent member 40, being at an 8° angle with the undersurface 38, reduces the ledge to a point 43 and thereby removes obstructive material and provides a clearer area for the locking movement of the locking washer 50. The high point or central portion 41 of the crescent froms the fulcrum for the ring or washer 50, as will be described.

An internally threaded bore 44 extends through the head and the axis of said bore is inclined at a 5° angle. The upper and lower portions of the bore are countersunk as at 46 and 48. The circular ring or washer 50 has flat and parallel opposite sides 52. The washer rests on the crescent surface 40, particularly the high point 41, and by reason of the taper or inclination of the crescent surface causes the ring or washer to rest at an inclined angle of approximately 5°, as best seen in FIG. 4. A screw 54 is in threaded engagement with the threaded bore 44. Said screw has a socket head 56 to receive a conventional tool for rotating the screw.

The miniature bit or cutting tool is indicated generally by the numeral 60 and it has spaced flat parallel sides 62 and 63, top and bottom edges 64 and 66, and the front cutting or tool edge 68. The bit is positioned so that its inner side 62 is flat against the front side 27 of the holder. The flat bottom edge 66 of the bit will rest on the inclined ledge surface 31, with only the outer portion of the bottom edge 66 engaging the lip surface, as shown in FIG. 4, and with the inner portion of the bottom edge slightly elevated from the ledge surface.

When the screw 54 is threaded inwardly in the bore 44, the ring or washer 50 will be engaged by the head 56 to press it against the top edge 64 of the bit. As seen, the ring or washer 50 rests on the high or center 41 of the crescent 40 at an inclined angle of 5°, with the front part of the ring or washer extending over the top edge 64 of the tool bit and engaging the top edge 64 adjacent its outer side wall. The inclination of the ring or washer 50 in engagement with the top outer edge 64 of the bit and the inclined surface 31 urges the tool bit towards the side wall 27 of the holder and causes the side wall 62 of the bit into flush engagement with the side wall 27 of the holder. It also serves to lock the bit against any movement relative to the holder.

The undersurfaces 36 and 38 of the overhanging members 26 and 28 are not in fractional engagement with the top edge 64 of the bit, however, they are close to the top edge 64 and they serve to provide the upper portion of a guideway for the bit when the bit is first inserted. The crescent 40 acts as a fulcrum for the ring or washer 50.

The tool bit may be readily inserted and secured in the holder and when held in set position will resist any external forces and vibrating motion. It likewise may be readily removed by loosening the screw 54. The shank 12 of the holder is secured to the shank holder in the conventional manner to support the cutting bit so that the cutting edge 68 thereof engages the work to groove same, as is well understood.

It will be understood that various changes and modifications may be made from the foregoing without departing from the spirit and scope of the appended claims.

What is claimed is:

1. A holder for bits or cutting tools, said holder having a recessed portion adjacent the top thereof, said recessed portion having a bottom and a surface raised with respect to said bottom, a threaded bore adapted to receive a screw having a head, a ring positioned in said recess and engaged by the head of the screw, means for supporting the bit, said ring engaging the top of the bit for locking said bit in said holder.

2. A structure defined in claim 1 in which the raised surface slopes downwardly towards the bore and in which a portion of the ring rests on the sloping raised surface.

3. A structure defined in claim 1 in which the raised surface is of crescent shape and inclines downwardly in the direction of the bore and in which a portion of the ring rests on the sloping raised surface.

4. A structure defined in claim 1 in which the axis of the bore is inclined to maintain the screw at an inclined angle.

5. A structure defined in claim 3 in which the axis of the bore is inclined to maintain the screw at an inclined angle.

6. A structure defined in claim 1 in which the means for supporting the bit includes an inclined lower ledge on which the bit rests.

7. A structure defined in claim 5 in which the means for supporting the bit includes an inclined lower ledge on which the bit rests.

8. A structure defined in claim 7 in which the angle of inclination of the crescent shaped surface is approximately 8° and the angle of inclination of the ring is approximately 8° and the angle of inclination of the bore is approximately 5° and the angle of inclination of the ledge is approximately 4°.

9. A holder for miniature bits and cutting tools, said holder comprising a shank portion and a head, said head having a U-shaped recess communicating with the top of the holder, a crescent shaped member at the bottom of said recess forming a fulcrum, a washer resting on said crescent shaped member and adapted to engage the top of a bit, an internally threaded bore in said head and a screw in engagement with said bore, said screw having a head engaging said washer to hold same in position.

10. A structure defined in claim 9 in which the crescent shaped member is raised with respect to the bottom of the recess and in which the crescent shaped member has an incline in the direction of the bore.

11. A structure defined in claim 9 in which a ledge is provided below the bottom of the recess on which the bit rests.

12. A structure defined in claim 9 in which the head has means for supporting the bit, said means comprising a ledge on which the bit rests and members extending over the top of the bit.

13. A structure defined in claim 12 in which the ledge inclines towards the bore and in which the axis of the bore is at an inclined angle.

14. A structure defined in claim 9 in which the head has a vertically extending front side and a ledge on which the bit rests, said ledge being inclined toward said front side and in which the inclined washer and the inclined ledge retain the side of the bit flush against the vertically extending front side of the head.

15. A structure defined in claim 2 in which the ring is maintained at an angle of approximately 8°.

No references cited.

WILLIAM W. DYER, JR., *Primary Examiner.*
HARRISON L. HINSON, *Examiner.*